(12) United States Patent
Bancroft

(10) Patent No.: US 9,326,900 B2
(45) Date of Patent: May 3, 2016

(54) VEHICLE SEAT FOR A DISABLED PERSON

(75) Inventor: Peter John Bancroft, Penshurst (AU)

(73) Assignee: Special Transport Solutions PTY LTD, Sydney (AU)

( * ) Notice: Subject to any disclaimer, the term of this patent is extended or adjusted under 35 U.S.C. 154(b) by 0 days.

(21) Appl. No.: 13/980,747

(22) PCT Filed: Jan. 20, 2012

(86) PCT No.: PCT/AU2012/000045
§ 371 (c)(1),
(2), (4) Date: Sep. 6, 2013

(87) PCT Pub. No.: WO2012/109698
PCT Pub. Date: Aug. 23, 2012

(65) Prior Publication Data
US 2014/0035263 A1    Feb. 6, 2014

(30) Foreign Application Priority Data
Jan. 21, 2011    (AU) ................................ 2011900184

(51) Int. Cl.
| | | |
|---|---|---|
| *B60N 2/24* | (2006.01) | |
| *A61G 3/02* | (2006.01) | |
| *B60N 2/015* | (2006.01) | |
| *B60N 3/02* | (2006.01) | |
| *B60N 2/04* | (2006.01) | |

(52) U.S. Cl.
CPC .............. *A61G 3/02* (2013.01); *B60N 2/01583* (2013.01); *B60N 2/01591* (2013.01); *B60N 2/04* (2013.01); *B60N 2/242* (2013.01); *B60N 2/245* (2013.01); *B60N 3/02* (2013.01)

(58) Field of Classification Search
CPC .. B60N 2/01508; B60N 2/01591; B60N 2/02; B60N 2/04; B60N 2/062; B60N 2/242; B60N 2/245; A61G 3/02
See application file for complete search history.

(56) References Cited

U.S. PATENT DOCUMENTS

| | | | |
|---|---|---|---|
| 1,835,840 A * | 12/1931 | Wright ........................ | 296/65.04 |
| 5,372,398 A * | 12/1994 | Aneiros et al. ............. | 296/65.03 |
| 6,056,346 A | 5/2000 | Smuk | |
| 6,179,363 B1 | 1/2001 | Palajac et al. | |
| 6,416,272 B1 * | 7/2002 | Suehiro et al. ................ | 414/546 |

FOREIGN PATENT DOCUMENTS

| | | |
|---|---|---|
| GB | 329910 | 5/1930 |
| JP | 2005-34325 | 2/2005 |

* cited by examiner

*Primary Examiner* — Jeffrey J Restifo
*Assistant Examiner* — Erez Gurari
(74) *Attorney, Agent, or Firm* — Andrew W. Chu; Craft Chu PLLC

(57) ABSTRACT

A seat for a vehicle, the seat being releasably anchored to the interior of the vehicle by an anchoring mechanism and having wheels to enable it to be rolled when not anchored to the interior of the vehicle. The seat is temporarily removable from the vehicle for the purpose of seating a person in the seat while it is outside of the vehicle, before moving the seat back into the vehicle while the person remains seated in it. The wheels are retractable from a lowered position for rolling the seat, to a raised position for anchoring the seat.

12 Claims, 8 Drawing Sheets

VEHICLE SEAT FOR A DISABLED PERSON

TECHNICAL FIELD

The present invention relates to removable vehicle seats and in particular to removable bus seats for disabled people.

BACKGROUND

Typically, when a disabled person in a wheelchair travels in a bus, the person remains in their regular wheelchair during the trip. The wheelchair is loaded into the bus whilst the disabled person remains seated in it, and it is then strapped down to prevent it from moving whilst the bus is in motion. A disadvantage of this method of travel is that a conventional wheelchair occupies considerable space in a bus, reducing the number of conventional seats in the bus and also limiting the number of disabled people that can travel at once. For example, a conventional wheelchair may occupy the space of four conventional bus seats. There are known methods of removing seats from a bus when it is necessary to make space for conventional wheelchairs, but this still reduces the seating capacity of the bus when transporting a wheelchair and the removed bus seats must be stored outside of the bus.

In some instances, such as in some of the public transport "low floor" Sydney Buses, a designated space is provided on each bus for disabled passengers in wheelchairs. This designated space is normally occupied by four inwardly facing foldable seats near the front of the bus to be used normally by passengers. However, should a disabled person in a wheelchair board the bus, the foldable seats are folded out of the way, so that the disabled person in the wheelchair may be secured by their wheelchair brakes in a forward facing direction. One of the disadvantages of such arrangement is that the wheelchair takes up the space of the four four foldable seats, primarily because of the size and shape of conventional wheelchairs.

Typically, when a disabled person in a wheelchair travels in a long distance bus, commonly referred to as a "coach", the person remains in their regular wheelchair during the trip. The wheelchair is loaded into the coach whilst the disabled person remains seated in it, and it is then strapped down to prevent it from moving whilst the coach is in motion. A disadvantage of this method of travel is that a conventional wheelchair occupies considerable space in a coach, reducing the number of conventional seats in the coach and also limiting the number of disabled people that can travel at once. A conventional wheelchair may occupy the space of four conventional coach seats. There are known methods of removing seats from a bus when it is necessary to make space for conventional wheelchairs, but this still reduces the seating capacity of the bus when transporting a wheelchair and the removed bus seats must be stored outside of the bus or in the luggage compartment. A disadvantage is that some coaches require considerable time to remove and store their conventional seats, so that a disabled person in a wheelchair may use the coach. Another disadvantage, is that it is not always convenient to remove seats and leave them behind at a the location where they were removed, as according to varying circumstances a coach may need to take its removed seats with it, as it may be necessary for those removed seats to be reinstalled for a future journey, once the disabled person in a wheelchair disembarks. Where the coach is substantially full of passengers, the stowage of removed seats compromises the available luggage space.

There are also situations where coaches are engaged for a group of passengers, such as for tourism or sports club trips for a number of days or weeks. In such situation a passenger, may incur illness or injury during the coach trip which is not so bad to prevent travel, but makes boarding and alighting coach difficult. The prior art method of removing seats to allow for strapping down of wheelchairs, is usually not feasible in such situations.

WO 03/026548 (Baribunma Holdings) discloses an improved apparatus for securing a self-propelled wheelchair to the floor of a vehicle for transport. Whilst this method is preferable to strapping down a conventional wheelchair, the self-propelled wheelchair still occupies considerable space within the vehicle. Also, this method requires the disabled person's own wheelchair to have an anchoring mechanism that matches the anchoring element in the vehicle. Generally this method is intended for use in specially modified smaller vans, where the disabled person is either a passenger or the driver of the van. Due to the considerable space occupied by the self-propelled wheelchair, it cannot be used in a multi-seat larger bus without comprising the space that could otherwise be used for regular seating within the bus.

The term "bus" as used herein includes, but is not limited to, mini-buses, public buses and coaches.

The present invention seeks to overcome at least one of the disadvantages of the prior art.

SUMMARY OF INVENTION

In a first aspect the present invention consists in a seat for a vehicle, the seat being releasably anchored to the interior of the vehicle by an anchoring mechanism and having wheels to enable it to be rolled when not anchored to the interior of the vehicle, the seat being temporarily removable from the vehicle for the purpose of seating a person in the seat whilst it is outside of the vehicle, before moving the seat back into the vehicle whilst the person remains seated in it.

Preferably the seat is of similar size and shape to other regular seats in the vehicle.

Preferably the seat is constructed by modifying a regular seat of the vehicle.

Preferably an anchoring element is attached to the interior of the vehicle, and the anchoring mechanism engages the anchoring element to anchor the seat.

Preferably the anchoring element is attached to the floor of the vehicle.

Preferably the anchoring mechanism comprises at least one anchoring projection that fits into a corresponding hook on the anchoring element, and at least one retractable pin that fits into a corresponding hole in the anchoring element.

Preferably the wheels are retractable from a lowered position for rolling the seat, to a raised position for anchoring the seat.

Preferably the wheels comprise two front wheels and two rear caster wheels, the front wheels being attached to a footrest that pivots upwards to retract the front wheels, and the rear caster wheels being attached to arms that pivot upwards to retract the rear caster wheels.

Preferably in one embodiment a lever is operated to manually retract the wheels into the raised position, and to extend the wheels into the lowered position.

Preferably in another embodiment an electromechanical actuator is used to retract the wheels into the raised position, and to extend the wheels into the lowered position.

Preferably the vehicle is a bus.

In a preferred embodiment the person is a disabled person.

In a second aspect the present invention consists in a method of transporting a person in a vehicle, the vehicle comprising a seat that is releasably anchored to the interior of the vehicle by an anchoring mechanism and having wheels to enable it to be rolled when not anchored to the interior of the vehicle, the method comprising releasing the anchoring mechanism and removing the seat from the vehicle, seating the person in the seat whilst it is outside of the vehicle, moving the seat back into the vehicle whilst the person remains seated in it, and anchoring the seat to the interior of the vehicle.

In a third aspect the present invention consists in a vehicle comprising at least one seat for a person, the seat being releasably anchored to the interior of the vehicle by an anchoring mechanism and having wheels to enable it to be rolled when not anchored to the interior of the vehicle, the seat being temporarily removable from the vehicle for the purpose of seating the person in the seat whilst it is outside of the vehicle, before moving the seat back into the vehicle whilst the person remains seated in it.

In a fourth aspect the present invention consists in a seat for a bus, the seat being releasably anchored to the interior of the bus by an anchoring mechanism and having wheels to enable it to be rolled when not anchored to the interior of the bus, the seat being temporarily removable from the bus for the purpose of seating a person in the seat whilst it is outside of the bus before moving the seat back into the bus whilst the person remains seated in it, wherein the wheels are retractable between a lowered rolling configuration and a raised anchoring configuration.

Preferably when said wheels are in raised anchoring configuration they are stowed substantially below the seat base, and when they are in the lowered rolling configuration they are extended so as to be disposed outwardly away from the seat base.

Preferably said seat is of a similar size and shape to other regular seats in the bus, and when the seat is in said raised anchoring configuration and said seat is anchored to the interior of the bus, the seat occupies a similar floor space to said other regular seats in the bus.

Preferably the wheels comprise two front wheels and two rear caster wheels, the front wheels being attached to a footrest that pivots upwards to retract the front wheels, and the rear caster wheels being attached to arms that pivot upwards to retract the rear caster wheels, when the wheels are being moved from the lowered rolling configuration to the raised anchoring configuration.

Preferably in one embodiment a lever is operated to manually retract the wheels into the raised position, and to extend the wheels into the lowered position.

Preferably in another embodiment an electromechanical actuator is used to retract the wheels into the raised position, and to extend the wheels into the lowered position.

In a fifth aspect the present invention consists in a method of transporting a person in a bus, the bus comprising a plurality of regular seats and at least one rolling seat that is releasably anchored to the interior of the bus by an anchoring mechanism and having wheels to enable it to be rolled when not anchored to the interior of the bus, the method comprising releasing the anchoring mechanism and removing the rolling seat from the vehicle, seating the person in the rolling seat whilst it is outside of the vehicle, moving the rolling seat back into the vehicle whilst the person remains seated in it, and anchoring the rolling seat to the interior of the vehicle, wherein the wheels are retractable between a lowered rolling configuration and a raised anchoring configuration.

Preferably said rolling seat is of a similar size and shape to the regular seats in the bus, and when the rolling seat is in said raised anchoring configuration and said rolling seat is anchored to the interior of the bus, the rolling seat occupies a similar floor space to the other regular seats in the bus.

In a sixth aspect the present invention consists in a bus comprising a plurality of regular seats and at least one rolling seat, the rolling seat being releasably anchored to the interior of the bus by an anchoring mechanism and having wheels to enable it to be rolled when not anchored to the interior of the bus, the rolling seat being temporarily removable from the bus for the purpose of seating a person in the seat whilst it is outside of the bus, before moving the rolling seat back into the bus whilst the person remains seated in it, wherein the wheels are retractable between a lowered rolling configuration and a raised anchoring configuration.

Preferably said rolling seat is of a similar size and shape to the plurality of regular seats in the bus, and when the rolling seat is in said raised anchoring configuration and said rolling seat is anchored to the interior of the bus, the rolling seat occupies a similar floor space to the other regular seats in the bus.

DESCRIPTION OF PREFERRED EMBODIMENTS

Figure 1:
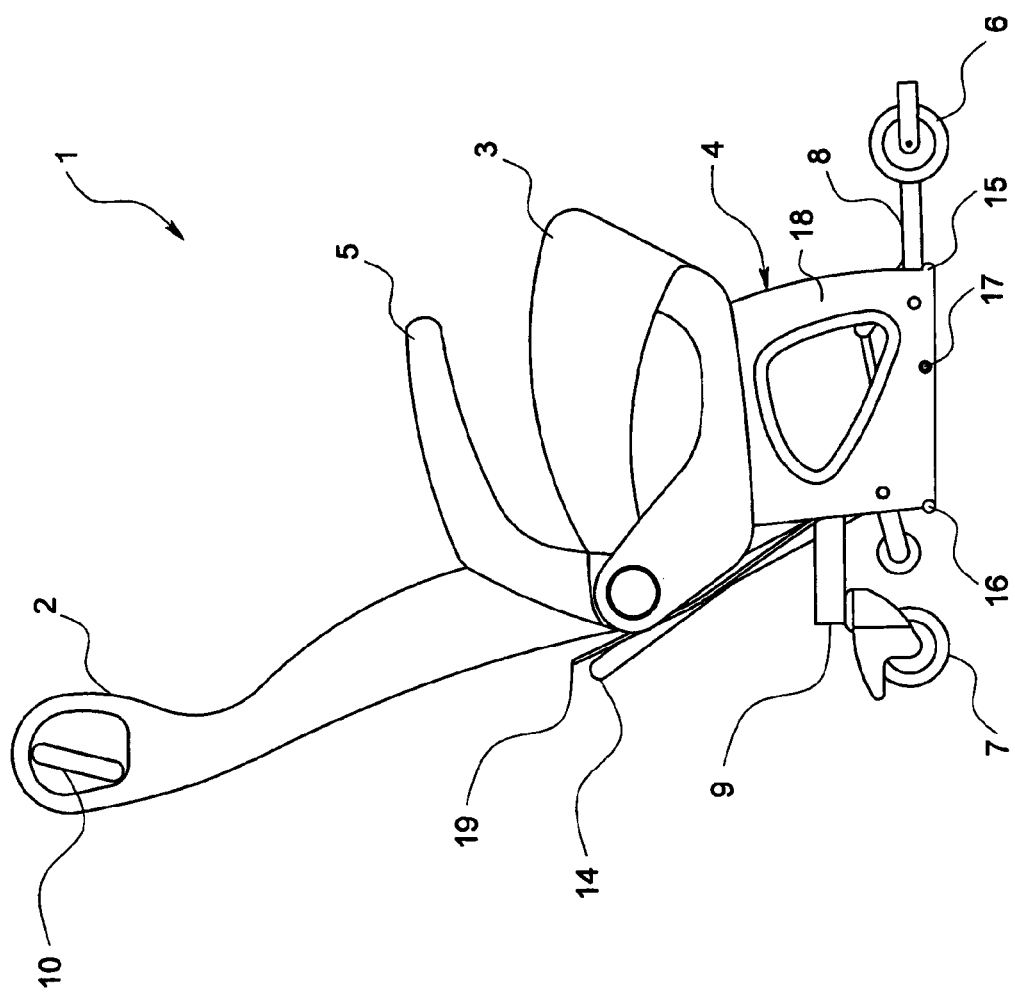
FIG. 1 is a side view of a vehicle seat for a disabled person in accordance with the present invention, with its wheels in a lowered rolling configuration.

FIGS. 1 to 5, 7 and 8 show a vehicle seat 1 for a disabled person in accordance with the present invention. Seat 1 comprises a base 4 that supports a lower cushion 3, a back rest 2, and a pair of arm rests 5. In this embodiment, seat 1 is for use in coach type buses. Seat 1 is of similar size and shape to the other regular seats (not shown) in the coach in that its lower cushion 3 and back rest 2 are similar to those of the regular seats, and the height of lower cushion 3 is also similar to that of the regular seats. Seat 1 may be constructed by modifying a regular seat.

Figure 5:
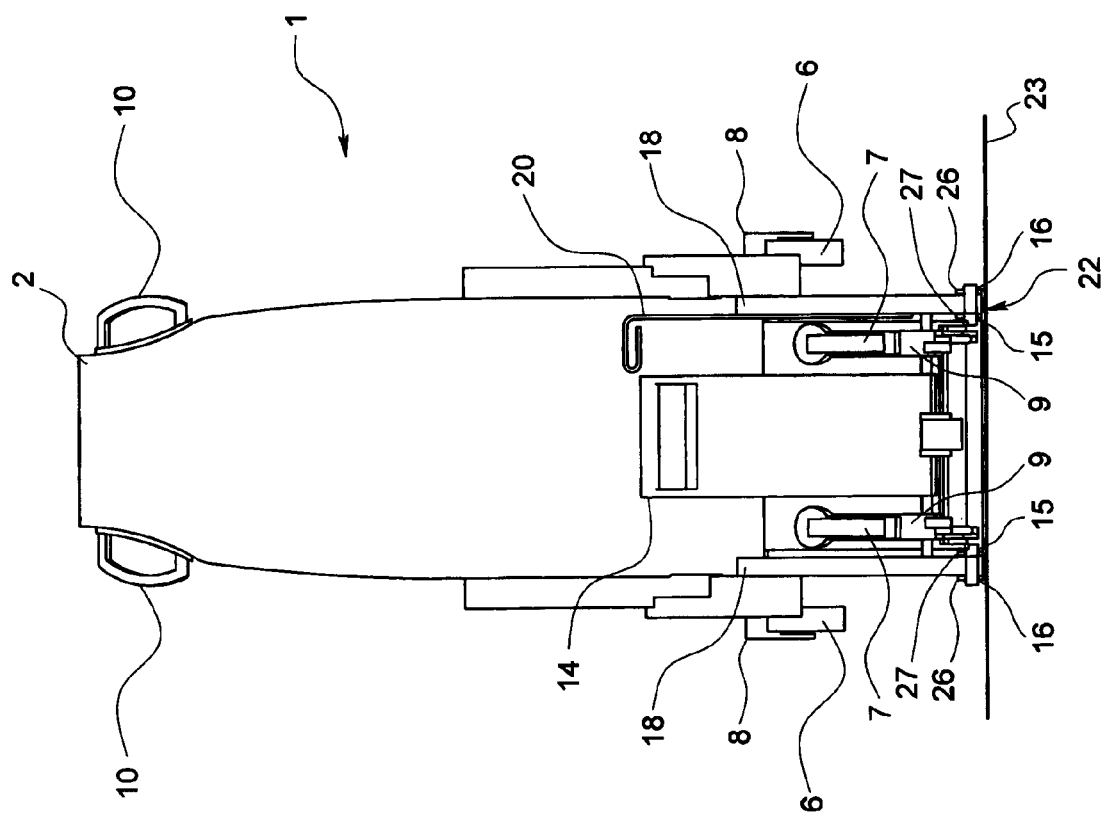
FIG. 5 is a rear view of the seat shown in FIG. 1, anchored to the floor of a bus.

Base 4 has two parallel vertical sides 18, on either side of seat 1, extending from the bottom of seat 1 up to the underside of lower cushion 3. A pair of free rolling front wheels 6 is attached to a pivoting footrest 8, and a pair of rear caster wheels 7 is pivotally attached to a pair of pivoting rear arms 9 that extend from the rear of base 4. As can be seen in FIG. 5, front wheels 6 are spaced outside of sides 18 of base 4, and rear caster wheels 7 are spaced apart within sides 18, such that front wheels 6 are spaced apart wider than rear wheels 7.

Figure 2:
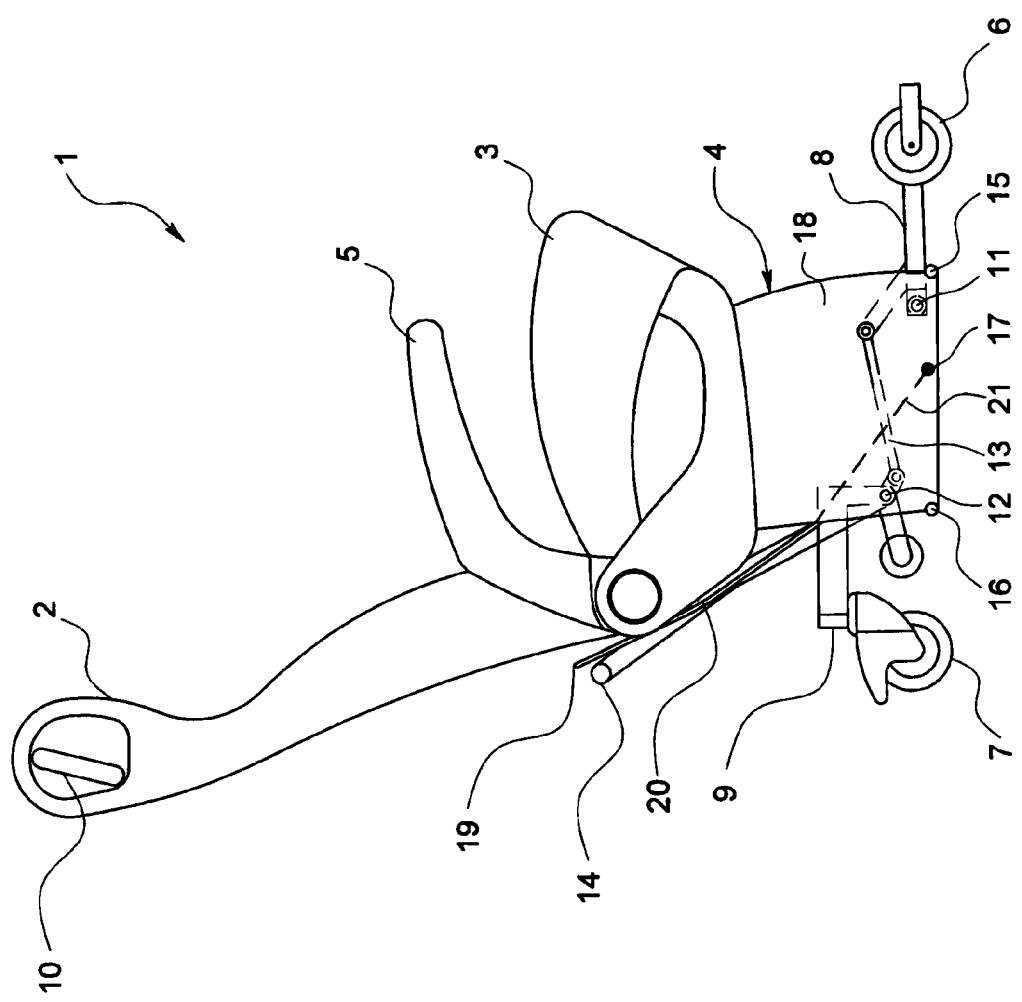
FIG. 2 is a side view of the seat shown in FIG. 1, with its wheels lowered for rolling the seat, showing some hidden detail of the mechanism that retracts the wheels.
Figure 8:
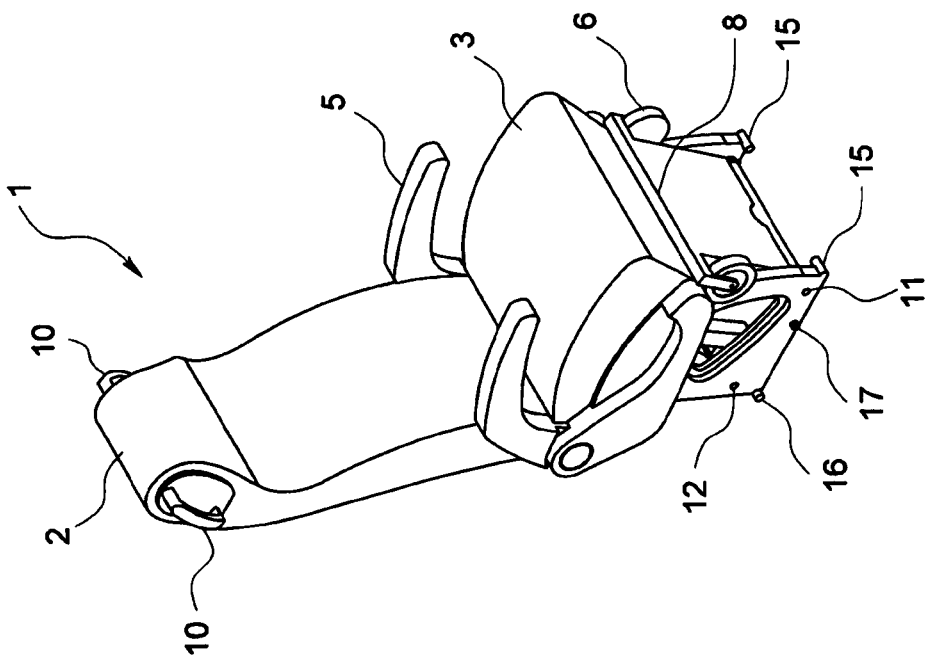
FIG. 8 is a front perspective view of the seat shown in FIG. 1.
Figure 10:
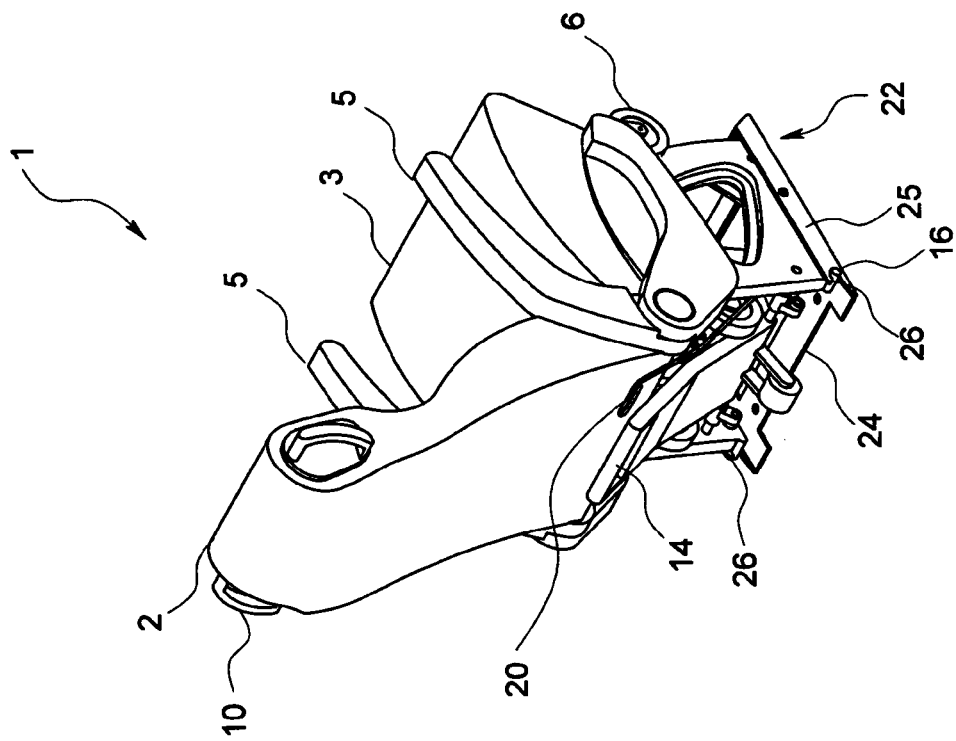
FIG. 10 is a rear perspective view of the seat shown in FIG. 9.
Figure 9:
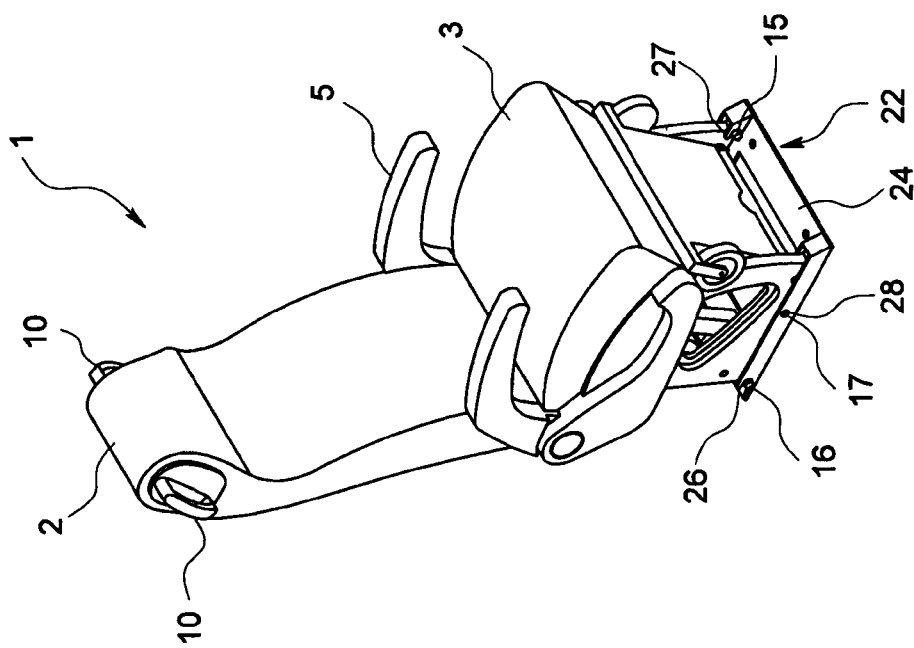
FIG. 9 is a front perspective view of the seat shown in FIG. 1 with the wheels in a retracted configuration and anchored to the anchoring element.

FIGS. 1, 2 and 8 show wheels 6 and 7 in a "lowered rolling configuration" to enable seat 1 to be rolled along the ground, or inside a bus, attached to backrest 2. In this lowered rolling configuration, wheels 6 and 7 support the weight of seat 1, and base 4 is clear of the ground by a distance that is adequate to not scrape the bottom of base 4 as seat 1 is rolled.

Figure 3:
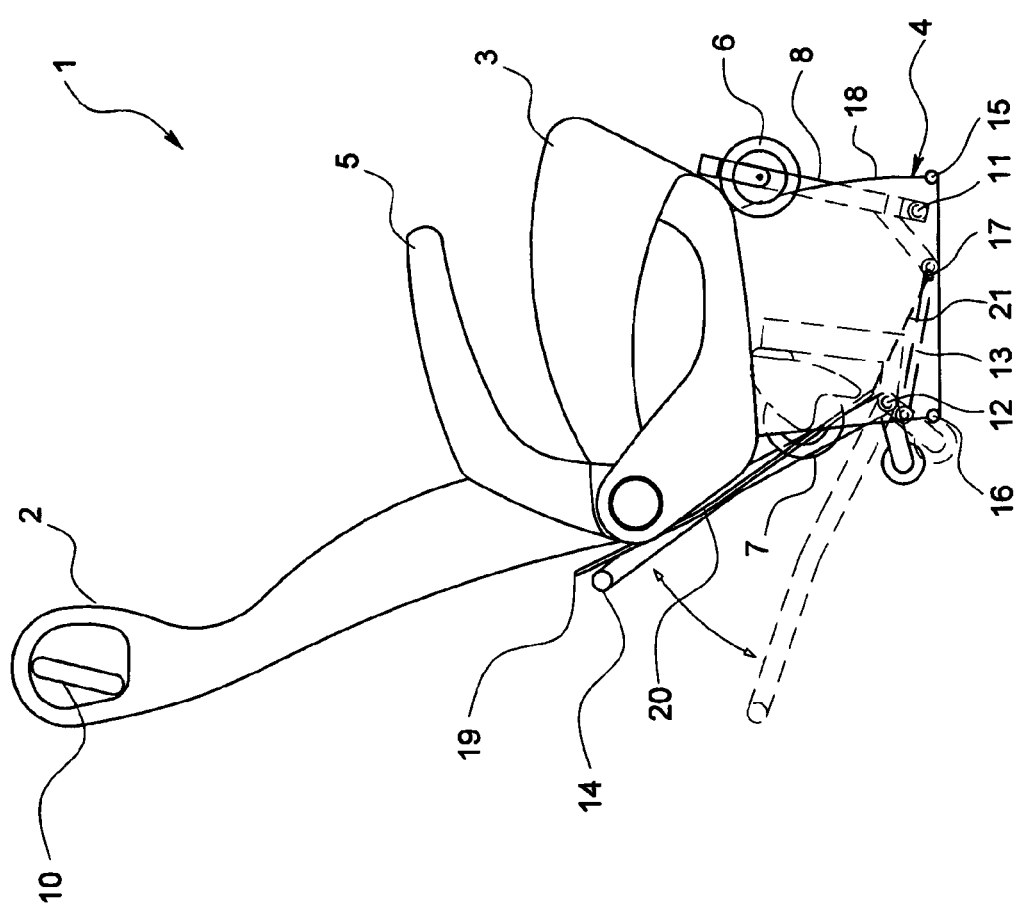
FIG. 3 is a side view of the seat shown in FIG. 1, with its wheels raised for anchoring the seat, showing some hidden detail of the mechanism that retracts the wheels.
Figure 4:
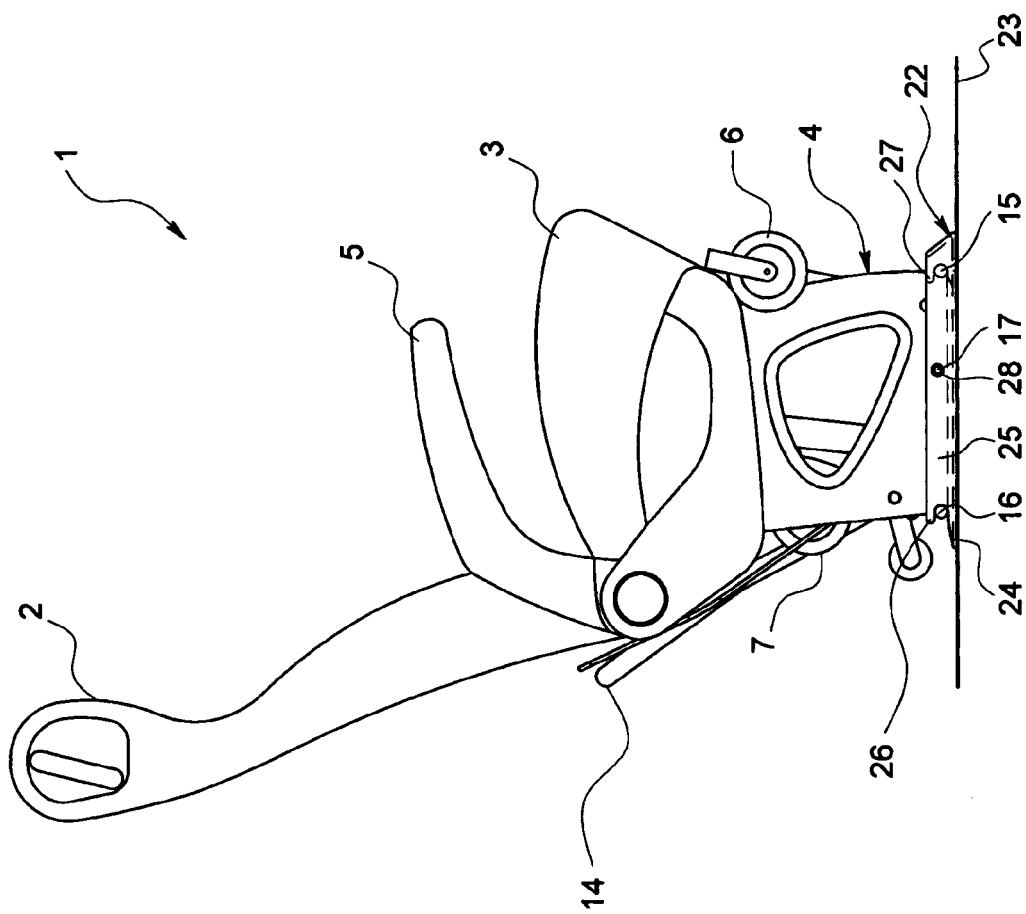
FIG. 4 is a side view of the seat shown in FIG. 1, anchored to the floor of a bus.
Figure 7:
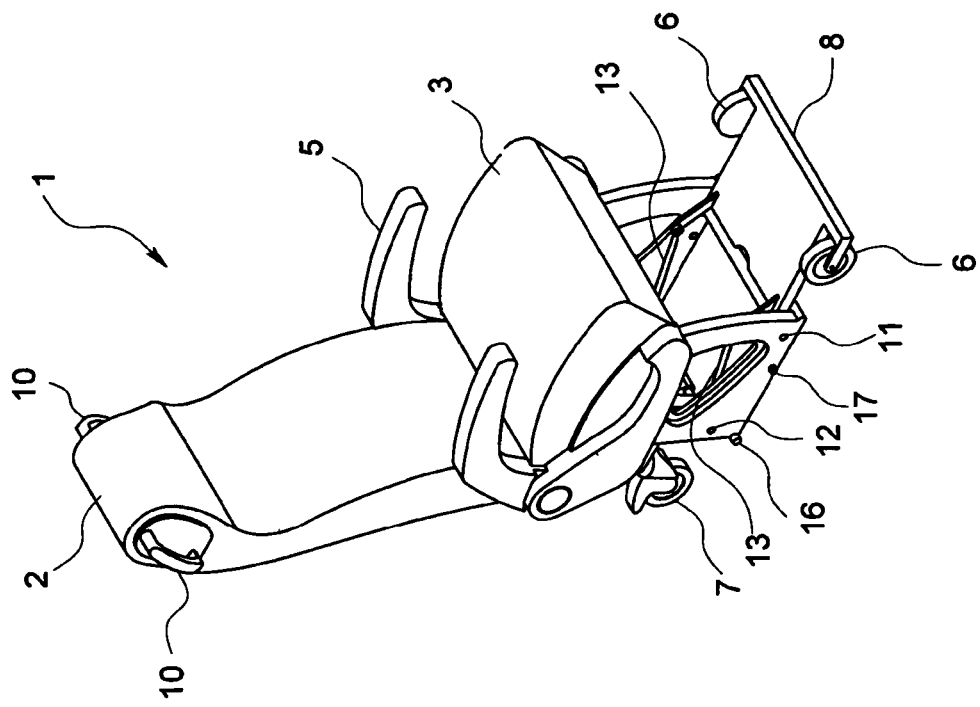
FIG. 7 is a front perspective view of the seat shown in FIG. 1, but with the wheels in a retracted configuration.

FIGS. 3, 4 and 7 shows wheels 6 and 7 retracted to a "raised anchoring configuration" for anchoring seat 1 to the floor of a bus. To achieve this configuration, footrest 8 pivots upwards about its pivot 11 until front wheels 7 are substantially tucked under the front of lower cushion 3, and rear arms 9 pivot upwards about their pivot 12 until rear caster wheels 7 are substantially tucked under the rear of lower cushion 3. In this raised anchoring configuration, seat 1 is compacted such that it occupies approximately the same space as a regular seat.

Footrest 8 and rear arms 9 are connected by a linkage 13, as shown in hidden detail in FIGS. 2 and 3, such that they raise and lower together. A lever 14 at the back of seat 1 is manually swung downwards and upwards, as shown in FIG. 3, to retract and extend wheels 6 and 7 to their raised and lowered positions by operating a mechanism (not shown) connected to footrest 8 and rear arms 9. Lever 14 is biased upwards by a spring (not shown). In other not shown embodiments, lever 14 may be extendable to provide additional leverage.

Seat 1 has an anchoring mechanism comprising two front anchoring projections 15, two rear anchoring projections 16, and two retractable pins 17. Anchoring projections 15 and 16 are short solid rods attached to the bottom of base 4. Front anchoring projections 15 are positioned at the front of each of the two sides 18 of base 4, and extend a short distance inwards from each side 18. Rear anchoring projections 16 are positioned at the back of each of the two sides 18, and extend a short distance outwards from each side 18.

One retractable pin 17 is positioned on each side 18 of base 4, between front and rear projections 15, 16, a short distance from the bottom of base 4. Retractable pins 17 slide in corresponding holes in sides 18 and are biased by springs (not shown) such that they normally protrude outwardly from each side 18. A handle 19 is attached to the top of a sliding rod 20 at the back of seat 1. A cable mechanism 21, shown in hidden details in FIGS. 2 and 3, connects the bottom of rod 20 to retractable pins 17 to retract pins 17 flush with sides 18 when handle 19 is manually lifted.

Figure 6:
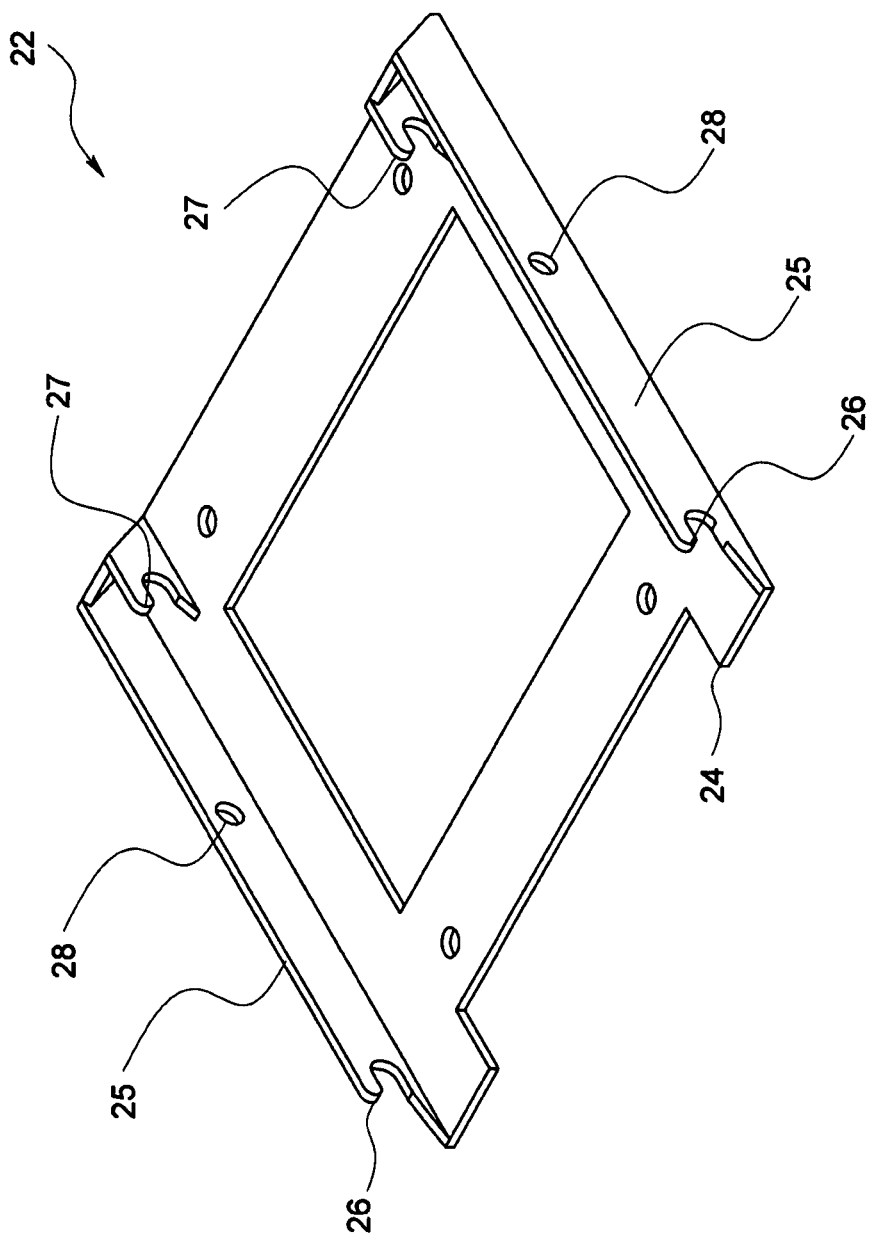
FIG. 6 is a perspective view of an anchor element for anchoring the seat shown in FIG. 1.

FIGS. 4 and 5 show seat 1 releasably anchored to the floor 23 of the bus by means of its anchoring mechanism 15, 16, 17 engaging an anchoring element 22 attached to the floor 23. Referring to FIG. 6, anchoring element 22 comprises a horizontal base plate 24 that bolts to floor 23, and two vertical side plates 25 parallel to the sides 18 of seat base 4, spaced apart slightly wider than base 4. Two rear hooks 26 are formed in the rear end of side plates 25, each with an opening facing the rear of anchoring element 22. Two front hooks 27 are attached near the front of anchoring element 22, spaced apart inside side plates 25, and each with an opening facing the rear of anchoring element 22. Each side plate 25 has a hole 28 through it. Seat 1 engages anchor plate 22 by front anchoring projections 15 fitting into front hooks 27, rear anchoring projections 16 fitting into rear hooks 26, and retractable pins 17 fitting into holes 28.

The method of operation of seat 1, in accordance with the present invention, will now be described. Starting with an empty seat 1 anchored to the bus floor 23 as shown in FIGS. 4 and 5, seat 1 is released from anchor element 22 by lifting handle 19 to retract pins 17 clear of side plates 25 and pulling seat 1 a short distance backwards until projections 15 and 16 are clear of hooks 26 and 27. Lever 14 is then operated to lower wheels 6 and 7, which raises seat 1 and enables it to be rolled using handle 10. Seat 1 is then temporarily removed from the bus, and rolled on the ground outside of the bus to position it as required.

A disabled person is then seated in seat 1 whilst it is outside of the bus. Typically the disabled person will initially be seated in a conventional wheelchair. The person is then transferred to seat 1 with aid of other people or a lifting means. If required, the conventional wheelchair can be collapsed and stowed in the luggage compartment of the bus. Seat 1 is then moved back into the bus, by rolling and lifting. It is then anchored back into anchor element 22 using the reverse of the procedure for releasing it, as follows. Seat 1 is rolled over anchor element 22 and lowered by raising wheels 6 and 7 with handle 19 lifted to retract pins 17. Seat 1 is then pushed forward such that projections 15 and 16 fit into hooks 26 and 27, and pins 17 will spring out into holes 28 when they align.

The advantage of using seat 1 over the prior art method of placing a conventional wheelchair inside of the bus is that seat 1 only occupies the same amount of space as a regular bus seat, enabling more passengers, disabled or otherwise, to travel in the bus. Furthermore, as the seatings portions 2, 3 of seat 1 are similar in size and shape to a regular seat when it is anchored to the floor of the bus, it can be used by non-disabled people when not required for disabled people.

Whilst the abovementioned embodiment utilises an actuator mechanism that is manually actuated via handle 19 and cable mechanism 21, it should be understood that in another not shown embodiment the actuator mechanism may employ an electromechanical actuator. Such an electromechanical actuator may be triggered by a switch or button, and powered by either a rechargeable battery or by power provided from the electrical power supply of the bus. For instance a "power supply contact" (not shown) may be associated with anchoring element 22 fitted to the bus. When seat 1 is brought into engagement with anchoring element 22 and pins 17 locked into place, power may be supplied from the bus to recharge a rechargeable battery or directly power a electromechanical actuator for raising the wheels 6 and 7.

Whilst the embodiment of the seat described above is intended for buses, the invention is equally applicable to disabled seating in other types of passenger vehicles.

The terms "comprising" and "including" (and their grammatical variations) as used herein are used in an inclusive sense and not in the exclusive sense of "consisting only of".

The invention claimed is:

1. A seat for a vehicle, said seat comprising:
an anchoring mechanism for releasably anchoring same to an anchoring element disposed on the interior floor of said vehicle, said seat having wheels to enable it to be rolled within said vehicle when not anchored to the floor of the vehicle, the seat being temporarily removable from the vehicle for the purpose of seating a person in the seat whilst it is outside of the vehicle, before moving the seat back into the vehicle whilst the person remains seated in it, said wheels are retractable from a lowered position to a raised position, wherein in use when said wheels are in said lowered position and a person sitting in the seat is placed in the vehicle, said seat may be rolled to a position over said anchoring element, and then said wheels are raised thereby causing said seat to lower so that said anchoring mechanism may anchor to said anchoring element,
wherein the wheels comprise two front wheels and two rear caster wheels, the front wheels being attached to a footrest that pivots upwards to retract the front wheels, and the rear caster wheels being attached to arms that pivot upwards to retract the rear caster wheels.

2. The seat for a vehicle as claimed in claim 1, wherein when said wheels are in said raised position they are stowed substantially below the base of said seat, and when they are in the lowered position they are extended so as to be disposed outwardly away from the base of the seat.

3. The seat for a vehicle as claimed in claim 1, wherein a lever is operated to manually retract the wheels into the raised position, and to extend the wheels into the lowered position.

4. The seat for a vehicle as claimed in claim 1, wherein an electromechanical actuator is used to retract the wheels into the raised position, and to extend the wheels into the lowered position.

5. The seat for a vehicle as claimed in claim 1, wherein said vehicle is a bus.

6. The seat for a vehicle as claimed in claim 1, wherein said person is a disabled person.

7. A seat for a vehicle, said seat comprising:
an anchoring mechanism for releasably anchoring same to an anchoring element disposed on the interior floor of said vehicle, said seat having wheels to enable it to be rolled within said vehicle when not anchored to the floor of the vehicle, the seat being temporarily removable from the vehicle for the purpose of seating a person in the seat whilst it is outside of the vehicle, before moving the seat back into the vehicle whilst the person remains seated in it, said wheels are retractable from a lowered position to a raised position, wherein in use when said wheels are in said lowered position and a person sitting in the seat is placed in the vehicle, said seat may be rolled to a position over said anchoring element, and then said wheels are raised thereby causing said seat to lower so that said anchoring mechanism may anchor to said anchoring element,
wherein said anchoring mechanism comprises at least one anchoring projection that fits into a corresponding hook on the anchoring element, and at least one retractable pin that fits into a corresponding hole in the anchoring element.

8. A seat for a bus, said seat comprising:
an anchoring mechanism for releasably anchoring same to an anchoring element disposed on the interior floor of said bus; and
wheels to enable it to be rolled within said bus when not anchored to the interior floor of the bus, said seat being temporarily removable from the bus for the purpose of seating a person in said seat whilst it is outside of the vehicle, before moving said seat back into said bus whilst the person remains seated in it, wherein said wheels are retractable between a lowered rolling configuration and a raised anchoring configuration, and in use when said wheels are in said lowered rolling configuration and a person sitting in said seat is placed in said bus, said seat may be rolled to a position over said anchoring element, and then said wheels are retracted to said anchoring configuration thereby allowing said seat to lower so that said anchoring mechanism may be anchored to said anchoring element,
wherein the wheels comprise two front wheels and two rear caster wheels, said front wheels being attached to a footrest that pivots upwards to retract the front wheels, and the rear caster wheels being attached to arms that pivot upwards to retract the rear caster wheels, when the wheels are being moved from the lowered rolling configuration to the raised anchoring configuration.

9. The seat for a bus as claimed in claim 8, wherein said wheels are retracted into the raised anchoring configuration they are stowed substantially below the base of said seat, and when they are in the lowered rolling configuration they are extended so as to be disposed outwardly away from the base of said seat.

10. The seat for a bus as claimed in claim 8, wherein said seat is of a similar size and shape to other regular seats in said bus, and when said seat has its wheels retracted to said anchoring configuration and said seat is anchored to said anchoring element, said seat occupies a same amount of space as to said other regular seats.

11. The seat for a bus as claimed in claim 8, wherein a lever is operated to manually retract the wheels into said raised anchoring configuration, and to extend the wheels into said lowered rolling configuration.

12. The seat for a bus as claimed in claim 8, wherein an electromechanical actuator is used to retract the wheels into said raised anchoring configuration, and to extend the wheels into said lowered rolling configuration.

* * * * *